(12) United States Patent
Garabello et al.

(10) Patent No.: US 8,397,598 B2
(45) Date of Patent: Mar. 19, 2013

(54) MOTOR-VEHICLE GEARBOX

(75) Inventors: Marco Garabello, Orbassano (IT);
Giancarlo Osella, Orbassano (IT);
Attilio Porta, Orbassano (IT); Gianluigi Pregnolato, Orbassano (IT); Sara Sottano, Orbassano (IT)

(73) Assignee: C.R.F. Societa Consortile per Azioni, Turin (IT)

( * ) Notice: Subject to any disclaimer, the term of this patent is extended or adjusted under 35 U.S.C. 154(b) by 1082 days.

(21) Appl. No.: 12/325,590

(22) Filed: Dec. 1, 2008

(65) Prior Publication Data

US 2009/0151496 A1 Jun. 18, 2009

(30) Foreign Application Priority Data

Dec. 18, 2007 (EP) .................................. 07425797

(51) Int. Cl.
*B60K 20/00* (2006.01)
*F16H 59/04* (2006.01)
*F16H 59/00* (2006.01)
*F16H 61/00* (2006.01)
*F16H 63/00* (2006.01)

(52) U.S. Cl. ...................... 74/473.36; 74/335

(58) Field of Classification Search ............... 74/473.36, 74/473.37, 473.21, 335
See application file for complete search history.

(56) References Cited

U.S. PATENT DOCUMENTS

| | | | | |
|---|---|---|---|---|
| 1,395,993 | A * | 11/1921 | Zoller | 74/473.36 |
| 2,962,914 | A * | 12/1960 | Peras | 74/473.26 |
| H295 | H * | 7/1987 | Numazawa et al. | 74/473.37 |
| 6,450,057 | B1 * | 9/2002 | Winkler et al. | 74/473.37 |
| 7,040,190 | B2 * | 5/2006 | Dinger et al. | 74/473.37 |
| 7,549,354 | B2 * | 6/2009 | Hara et al. | 74/473.37 |
| 7,717,010 | B2 * | 5/2010 | Bar et al. | 74/473.37 |
| 2007/0209466 | A1 * | 9/2007 | Garabello et al. | 74/473.37 |
| 2009/0107279 | A1 * | 4/2009 | Garabello et al. | 74/473.37 |
| 2009/0114050 | A1 * | 5/2009 | Garabello et al. | 74/473.37 |

FOREIGN PATENT DOCUMENTS

| | | |
|---|---|---|
| DE | 19921623 | 11/2000 |
| EP | 0 702 172 | 3/1996 |
| EP | 1 128 097 | 8/2001 |
| EP | 1 548333 | 6/2005 |
| EP | 1832786 A1 | 9/2007 |
| EP | 1930626 A1 | 6/2008 |

* cited by examiner

*Primary Examiner* — Troy Chambers
*Assistant Examiner* — Michael Gonzalez
(74) *Attorney, Agent, or Firm* — Sughrue Mion, PLLC (57) ABSTRACT

The gearbox comprises an engagement sleeve movable between a neutral position and one engagement position for engagement of one given gear, and a shift fork operatively connected to the engagement sleeve for controlling the movement thereof between the neutral position and the engagement position. The shift fork is slidably mounted on a stationary support rod, which is provided with a pair of bushes defining a first axial abutment surface for stopping the movement of the shift fork in the direction from the neutral position to the engagement position and a second axial abutment surface for stopping the movement of the shift fork in the direction from the engagement position to the neutral position. The neutral position of the shift fork is axially spaced from the second axial abutment surface.

7 Claims, 6 Drawing Sheets

MOTOR-VEHICLE GEARBOX

BACKGROUND OF THE INVENTION

The present invention relates to a motor-vehicle gearbox which can be used both in a double-clutch transmission and in a single-clutch transmission. More precisely, the present invention relates to a gearbox in which one of the sliding engagement sleeves is arranged to control the engagement of one gear only, i.e. to couple for rotation with a secondary shaft of the gearbox only one idle gearwheel carried by that secondary shaft and acting as a driven wheel of the gear train associated to that gear, wherein this sliding engagement sleeve is connected to a respective shift fork the translational movement of which is controlled by a double-acting hydraulic linear actuator having a plunger connected to the fork and two opposite chambers which can be alternatively connected to a fluid supply source or to a tank under control of a pair of gear shift solenoid valves, and wherein the hydraulic actuator is provided with a linear position sensor able to provide an electronic control unit with a signal indicative of the position of the plunger for feedback control of the two gear shift solenoid valves.

SUMMARY OF THE INVENTION

It is an object of the present invention to provide a motor-vehicle gearbox which is able to safely and reliably operate also in case of failure or malfunctioning of the solenoid valve controlling the disengagement of the aforesaid gear, or generally in case of any electric, hydraulic or mechanical failure of the gear shift control system, which failure entails the switch-off signal not being received by the solenoid valve controlling the disengagement of the aforesaid gear at the end of the phase of disengagement of that gear, as well as in case of failure or malfunctioning of the linear position sensor of the hydraulic actuator controlling the shift fork associated to the aforesaid gear.

This and other objects are fully achieved according to the invention by virtue of a gearbox comprising an engagement sleeve movable between a neutral position and one engagement position for engagement of one given gear, a sliding shift fork operatively connected to the engagement sleeve for controlling the movement thereof between the neutral position and the engagement position, a first axial abutment surface for stopping the movement of the shift fork in the direction from the neutral position to the engagement position and a second axial abutment surface for stopping the movement of the shift fork in the direction from the engagement position to the neutral position, wherein the neutral position of the shift fork is axially spaced from the second axial abutment surface.

BRIEF DESCRIPTION OF THE DRAWINGS

The characteristics and the advantages of the invention will appear from the following detailed description, given purely by way of non-limiting example with reference to the appended drawings, in which.

In the following description, the terms "left" and "right" are referred each time to the point of view of the person observing the figure in question and are only used in order to make the understanding of what is illustrated in that figure easier. Therefore, they do not have to be intended in a limiting way at all.

DETAILED DESCRIPTION OF THE PREFERRED EMBODIMENTS

Figure 1:
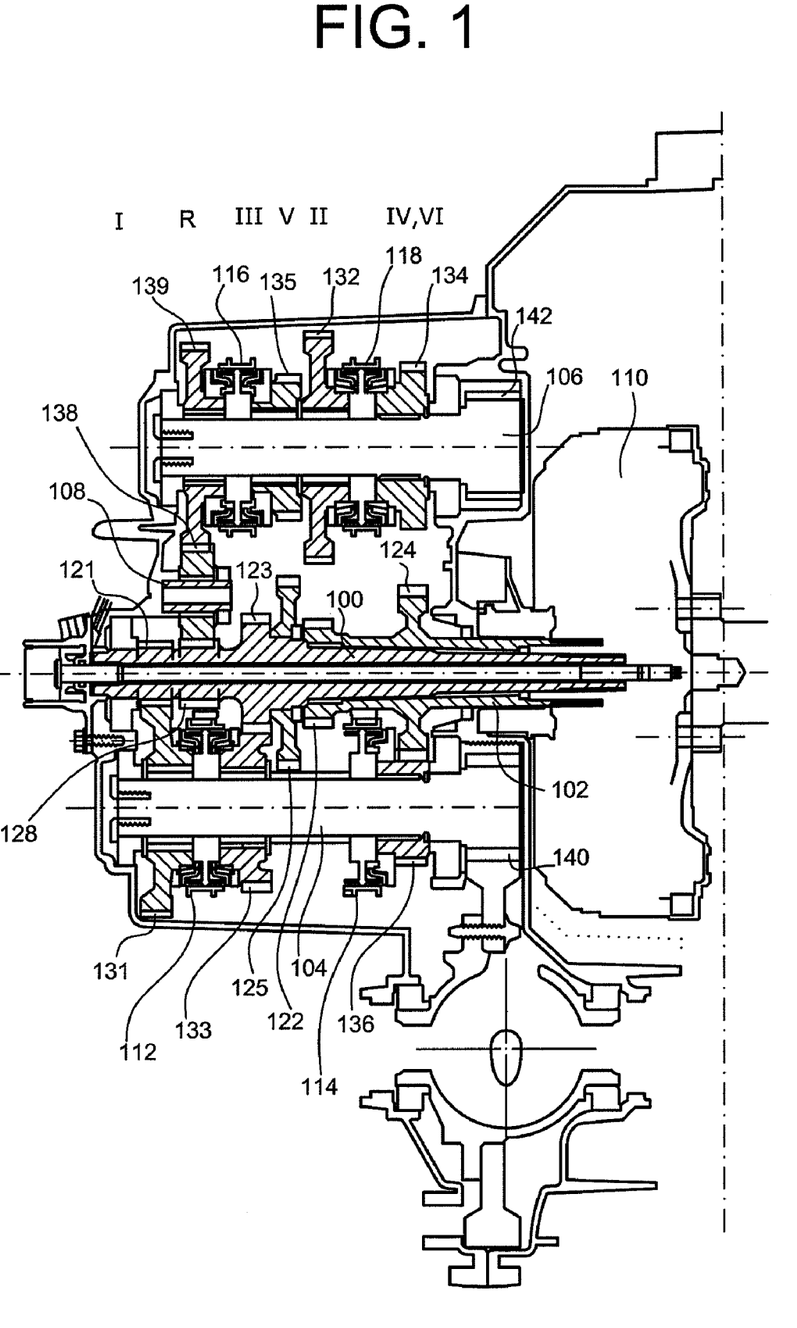
FIG. 1 is an axial section view of a gearbox for a motor-vehicle double-clutch transmission with six forward gears and one reverse gear according to the prior art.

An example of a gearbox for a motor-vehicle double-clutch transmission with six forward gears and one reverse gear to which the present invention is applicable is shown in FIG. 1 and corresponds to the transmission disclosed in European Patent Application EP1930626 in the name of the Applicant.

With reference to FIG. 1, the transmission includes a pair of coaxial primary shafts 100 and 102, that is, an inner primary shaft and an outer primary shaft, respectively, a pair of secondary shafts 104 and 106, an intermediate shaft 108 for the reverse gear, and a clutch unit 110 comprising a pair of friction clutches for coupling each a respective primary shaft with the driving shaft of the motor vehicle (not shown) through a flywheel (also not shown).

The inner primary shaft 100 carries a plurality of driving gearwheels associated to the odd gears (first, third and fifth gears) and to the reverse gear, while the outer primary shaft 102 carries a plurality of driving gearwheels associated to the even gears (second, fourth and sixth gears). In order to make the understanding of the way of operation of the transmission easier, the Roman numerals I, II, III, IV, V, VI and the letter R have been located in FIG. 1, as well as in FIGS. 2 and 3 described herein below, at the same level as the planes of the gear trains associated to the first gear, to the second gear, to the third gear, to the fourth gear, to the fifth gear, to the sixth gear and to the reverse gear, respectively.

More specifically, the inner primary shaft 100 carries in the order (starting from the end opposite to the clutch unit 110, that is, from the left-hand end according to the point of view of a person observing FIG. 1), a driving gearwheel 121 associated to the first gear, a driving gearwheel 128 associated to the reverse gear, a driving gearwheel 123 associated to the third gear and a driving gearwheel 125 associated to the fifth gear, while the outer primary shaft 102 carries in the order from left to right a driving gearwheel 122 associated to the second gear and a driving gearwheel 124 associated both to the fourth gear and to the sixth gear. All the above-mentioned driving gearwheels are drivingly connected for rotation with the respective primary shaft.

The first secondary shaft 104 carries in the order (starting from the end opposite to the clutch unit 110, that is, from the left-hand end according to the point of view of the person observing FIG. 1), an idle gearwheel 131 permanently meshing with the driving gearwheel 121 of the inner primary shaft 100 to implement the first gear, an idle gearwheel 133 permanently meshing with the driving gearwheel 123 of the inner primary shaft 100 to implement the third gear, an idle gearwheel 136 permanently meshing with the driving gearwheel 124 of the outer primary shaft 102 to implement the sixth gear, and a final reduction pinion 140. The intermediate shaft 108 for the reverse gear carries an idle gearwheel 138 permanently meshing with the driving gearwheel 128 of the inner primary shaft 100. The second secondary shaft 106 carries in the order from left to right an idle gearwheel 139 permanently meshing with the idle gearwheel 138 of the intermediate shaft 108 to implement the reverse gear, an idle gearwheel 135 permanently meshing with the driving gearwheel 125 of the inner primary shaft 100 to implement the fifth gear, an idle gearwheel 132 permanently meshing with the driving gearwheel 122 of the outer primary shaft 102 to implement the second gear, an idle gearwheel 134 permanently meshing with the driving gearwheel 124 of the outer primary shaft 102 to implement the fourth gear, and a final reduction pinion 142.

The first secondary shaft 104 further carries a sliding engagement sleeve 112 selectively movable to the left or to the right to drivingly connect the idle gearwheel 131 or the idle gearwheel 133, respectively, for rotation with the shaft 104 in order to engage the first gear or the third gear, respectively, and a sliding engagement sleeve 114 movable to the right to drivingly connect the idle gearwheel 136 for rotation with the shaft 104 in order to engage the sixth gear. The second secondary shaft 106 further carries a sliding engagement sleeve 116 selectively movable to the left or to the right to drivingly connect the idle gearwheel 139 or the idle gearwheel 135 for rotation with the shaft 106, respectively, in order to engage the reverse gear or the fifth gear, respectively, and a sliding engagement sleeve 118 selectively movable to the left or to the right to drivingly connect the idle gearwheel 132 or the idle gearwheel 134, respectively, for rotation with the shaft 106 in order to engage the second gear or the fourth gear, respectively.

Figure 2:
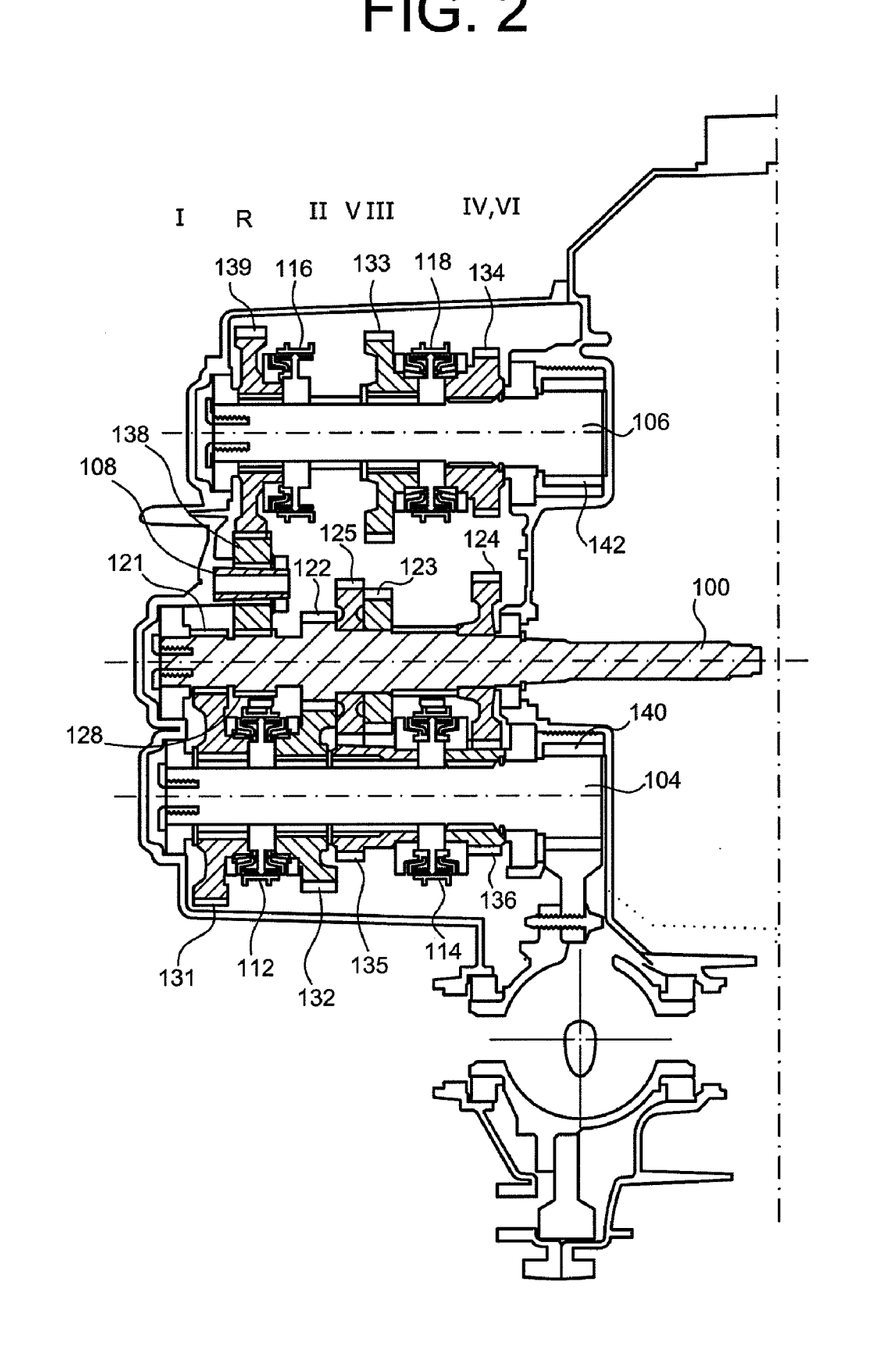
FIG. 2 is an axial section view of a gearbox for a motor-vehicle single-clutch transmission with six forward gears and one reverse gear derived from the transmission of FIG. 1.

A motor-vehicle single-clutch transmission with six forward gears and one reverse gear derived from the transmission of FIG. 1 is illustrated in FIG. 2, where parts and elements identical or corresponding to those of FIG. 1 have been given the same reference numerals.

The transmission of FIG. 2 includes a single primary shaft 100, a pair of secondary shafts 104 and 106, an intermediate shaft 108 for the reverse gear, and a clutch unit 110 comprising a single friction clutch for coupling the primary shaft 100 with the driving shaft of the motor vehicle (not shown) through a flywheel (also not shown).

Figure 3:
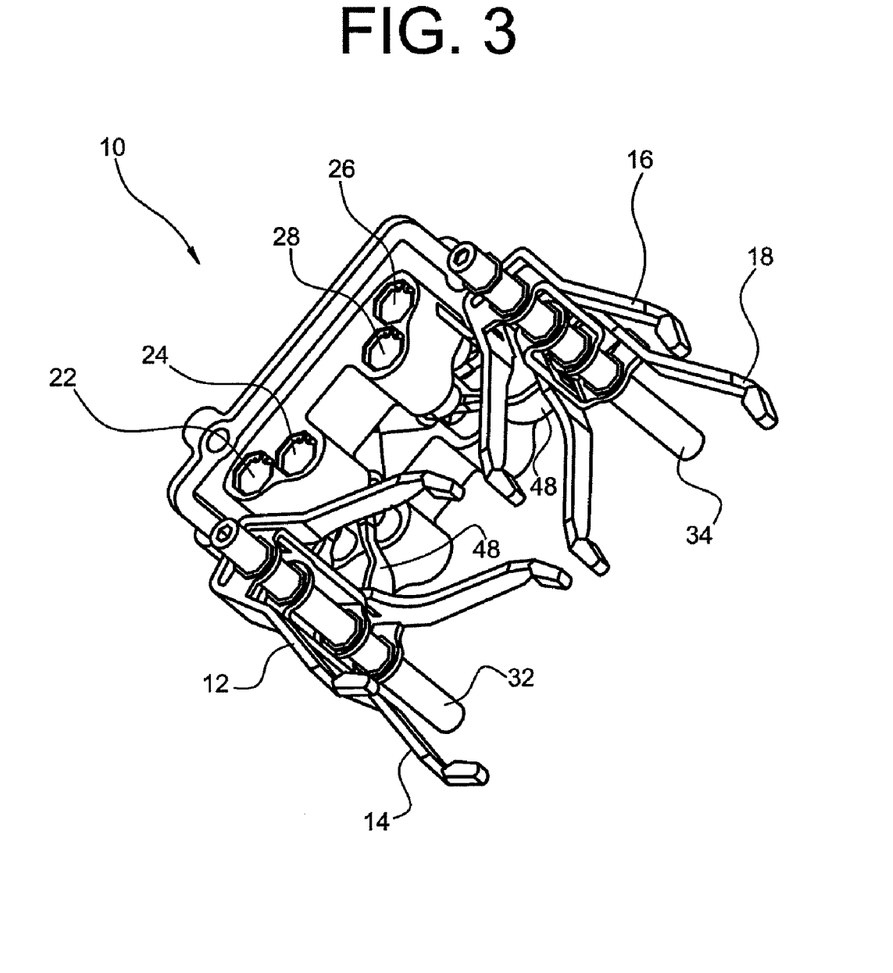
FIG. 3 is a perspective view of a gear shift control device forming part of an electro-hydraulic control system for the gearbox of either FIG. 1 or FIG. 2.

The primary shaft 100 carries in the order (starting from the end opposite to the clutch unit 110, that is, from the left-hand end according to the point of view of the person observing FIG. 3) a driving gearwheel 121 associated to the first gear, a driving gearwheel 128 associated to the reverse gear, a driving gearwheel 122 associated to the second gear, a driving gearwheel 125 associated to the fifth gear, a driving gearwheel 123 associated to the third gear and a driving gearwheel 124 associated both to the fourth gear and to the sixth gear. All the above-mentioned driving gearwheels are drivingly connected for rotation with the primary shaft 100.

The first secondary shaft 104 carries in the order (starting from the end opposite to the clutch unit 110, that is, from the left-hand end according to the point of view of the person observing FIG. 3) an idle gearwheel 131 permanently meshing with the driving gearwheel 121 to implement the first gear, an idle gearwheel 132 permanently meshing with the driving gearwheel 122 to implement the second gear, an idle gearwheel 135 permanently meshing with the driving gearwheel 125 to implement the fifth gear, an idle gearwheel 136 permanently meshing with the driving gearwheel 124 to implement the sixth gear, and a final reduction pinion 140. The intermediate shaft 108 for the reverse gear carries an idle gearwheel 138 permanently meshing with the driving gearwheel 128. The second secondary shaft 106 carries in the order from left to right an idle gearwheel 139 permanently meshing with the idle gearwheel 138 of the intermediate shaft 108 to implement the reverse gear, an idle gearwheel 133 permanently meshing with the driving gearwheel 123 to implement the third gear, an idle gearwheel 134 permanently meshing with the driving gearwheel 124 to implement the fourth gear, and a final reduction pinion 142.

The first secondary shaft 104 further carries a sliding engagement sleeve 112 selectively movable to the left or to the right to connect the idle gearwheel 131 or the idle gearwheel 132, respectively, for rotation with the shaft 104 in order to engage the first gear or the second gear, respectively, and a sliding engagement sleeve 114 selectively movable to the left or to the right to connect the idle gearwheel 135 or the idle gearwheel 136, respectively, for rotation with the shaft 104 in order to engage the fifth gear or the sixth gear, respectively. The second secondary shaft 106 further carries a sliding engagement sleeve 116 movable to the left to connect the idle gearwheel 139 for rotation with the shaft 106 in order to engage the reverse gear, and a sliding engagement sleeve 118 selectively movable to the left or to the right to connect the idle gearwheel 133 or the idle gearwheel 134, respectively, for rotation with the shaft 106 in order to engage the third gear or the fourth gear, respectively.

In both the examples described above with reference to FIGS. 1 and 2, the gearbox comprises a "single" engagement sleeve, i.e. an engagement sleeve operable to control the engagement of one gear only. In the gearbox of FIG. 1 it is about the engagement sleeve 114 associated to the idle gearwheel 136 of sixth gear, whereas in the gearbox of FIG. 2 it is about the engagement sleeve 116 associated to the idle gearwheel 139 of reverse gear. As will be become apparent from the following part of the description, the invention is generally applicable to any gearbox having a "single" engagement sleeve, provided that this sleeve is connected to a shift fork controlled by a double-acting hydraulic linear actuator having a plunger connected to the fork and two opposite chambers which can be connected alternatively to a fluid supply source or to a tank under control of a pair of gear shift solenoid valves, the hydraulic actuator being provided with a linear position sensor able to provide an electronic control unit with a signal indicative of the position of the plunger for feedback control of the two gear shift solenoid valves.

Figure 5:
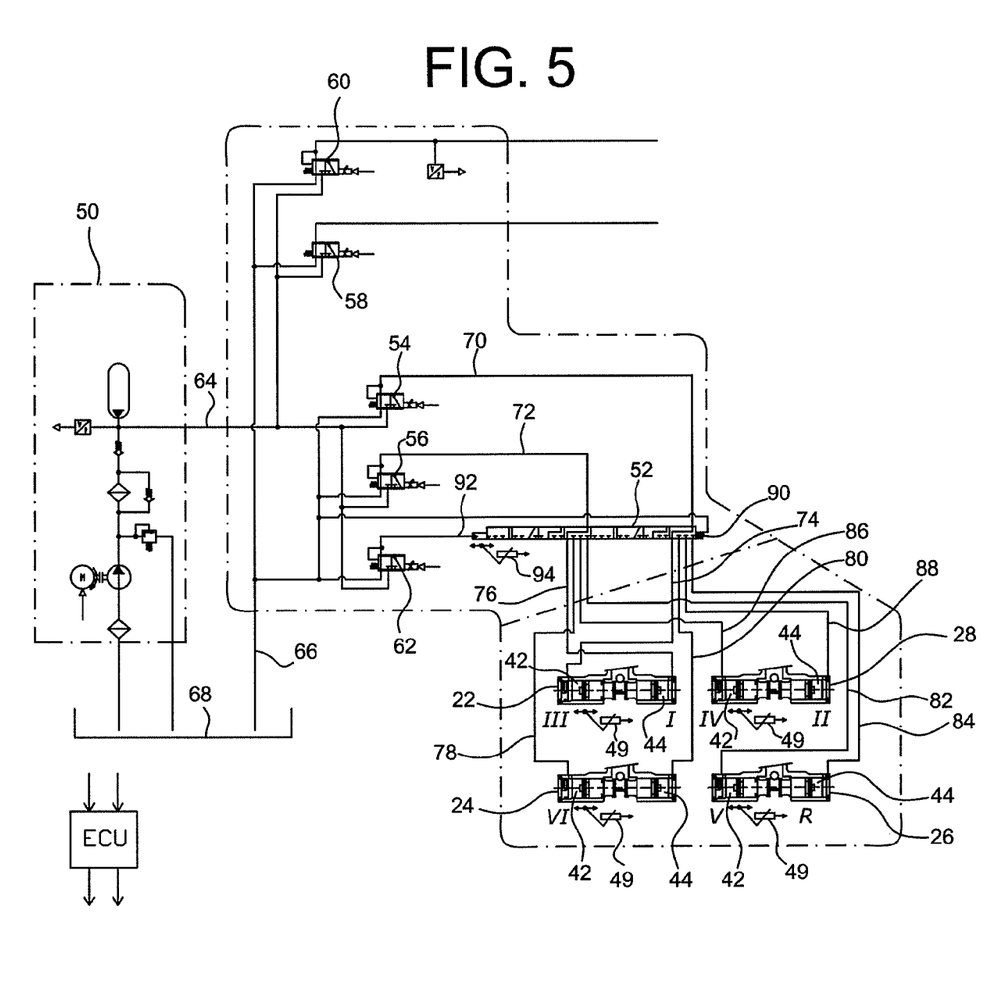
FIG. 5 is a scheme of a hydraulic circuit forming part of the electro-hydraulic control system for the gearbox of FIG. 1.
Figure 6:
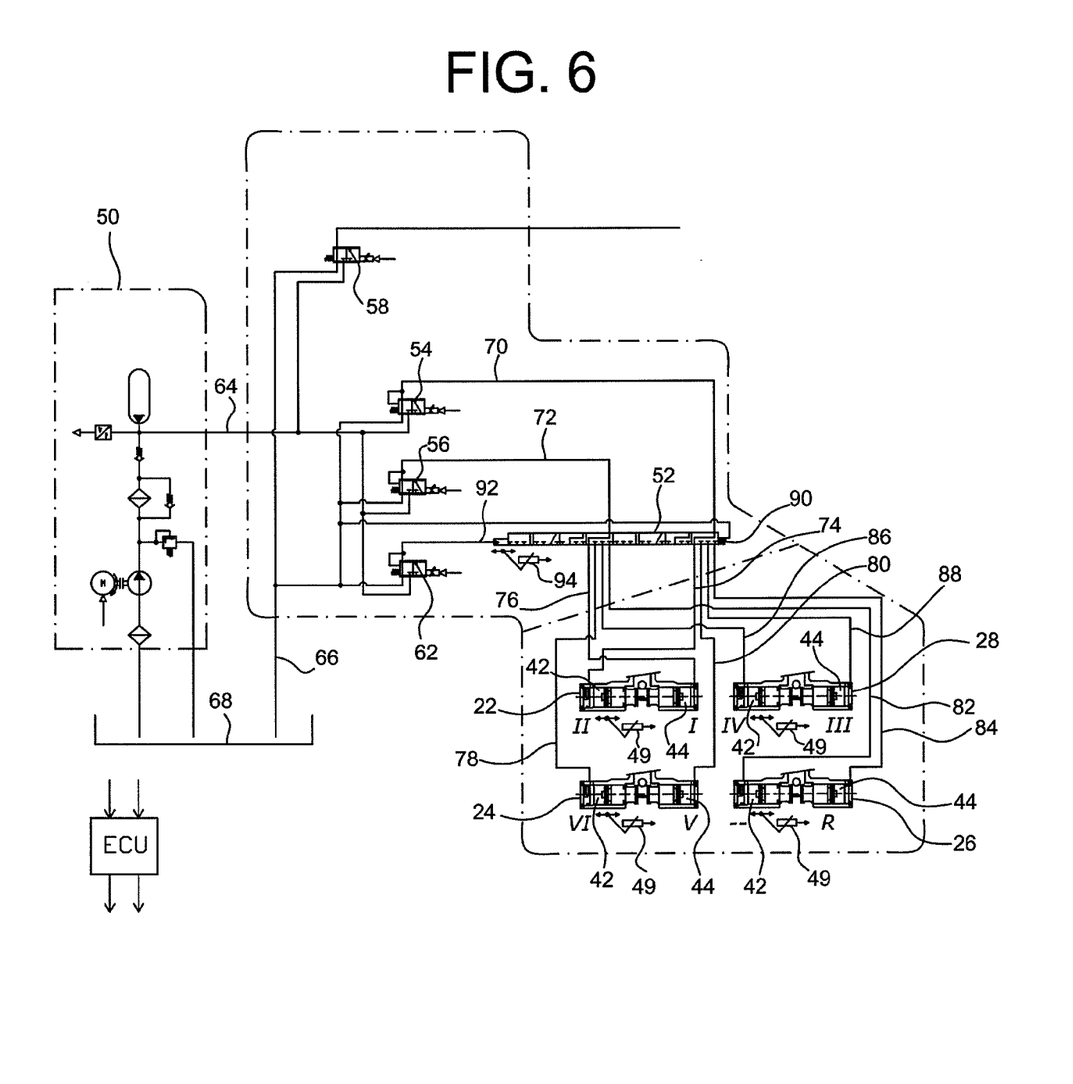
FIG. 6 is a scheme of a hydraulic circuit forming part of the electro-hydraulic control system for the gearbox of FIG. 2.

An electro-hydraulic control system is provided to control the engagement of the gears and basically includes a gear shift control device, illustrated in FIG. 3 and generally indicated with the reference numeral 10 therein, and a hydraulic circuit, illustrated in FIG. 5 in its configuration intended for a double-clutch transmission and in FIG. 6 in its configuration intended for a single-clutch transmission.

With reference to FIG. 3, the gear shift control device 10 includes four shift forks 12, 14, 16 and 18, operatively associated each to a respective engagement sleeve 112, 114, 116 and 118 for controlling the movement of this latter between first and second engagement positions, in which it couples either of the idle gearwheels associated thereto for rotation with the respective secondary shaft 104 or 106 of the transmission. The gear shift control device 10 further includes an actuating unit comprising four double-acting hydraulic actuators, indicated with the reference numerals 22, 24, 26 and 28, respectively, each of which is arranged to control the displacement of a respective shift fork 12, 14, 16 and 18, and hence of a respective engagement sleeve 112, 114, 116 and 118, between said first and second engagement positions.

In the example of construction illustrated in FIG. 3, the shift forks 12, 14, 16 and 18 are mounted in pairs on two stationary rods 32 and 34 parallel to the secondary shafts 104 and 106 of the transmission. More particularly, the two shift forks 12 and 14 are slidably mounted on the rod 32, while the other two shift forks 16 and 18 are slidably mounted on the rod 34. Alternatively, the shift forks may be secured each to a respective sliding support rod.

The shift forks 12, 14, 16 and 18 illustrated in FIG. 3 are advantageously made according to the teachings of European Patent Application EP1832786 or of non-published European Patent Application No. 07425666.0, both in the name of the Applicant, that is to say, with identical bodies suitably shaped to enable a partially overlapping arrangement of each pair of shift forks mounted on the same rod. It is however clear that the shift forks may have any other shape.

Figure 4:
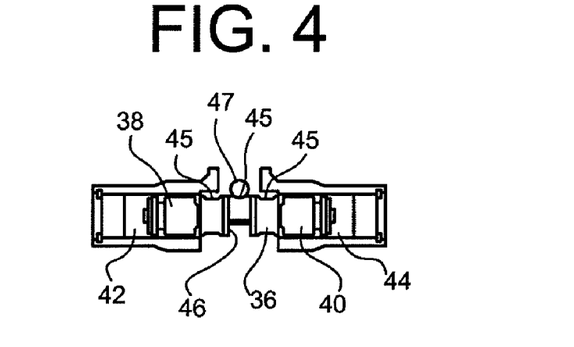
FIG. 4 is a simplified axial section view of a double-acting hydraulic actuator of the gear shift control device of FIG. 3.

As schematically illustrated in FIG. 4, each hydraulic actuator includes a plunger 36 forming at its opposite ends first and second head portions 38 and 40, which are slidably and fluid-tightly arranged in first and second chambers 42 and 44, respectively. In its intermediate area between the head portions 38 and 40, the plunger 36 has on its cylindrical side surface a recess 46 in which an actuating nose 48 (FIG. 3) of the shift fork 12, 14, 16 or 18 associated to the actuator engages, in such a manner that the translational movement of the plunger of each hydraulic actuator is transmitted to the associated shift fork and hence to the associated engagement sleeve. The recesses 46 of the plungers 36 of the four hydraulic actuators 22, 24, 26 and 28 are preferably arranged in a single plane, in the intermediate neutral position between the two engagement positions. Each plunger 36 also has three positioning notches 45 equally spaced in the sliding direction of the plunger. A position-marking ball 47 engages alternatively in one of the three positioning notches 45 of the plunger 36 to hold the associated shift fork 12, 14, 16 or 18 in the neutral position or in either of the engagement positions.

Each hydraulic actuator 22, 24, 26 and 28 is also provided with a position sensor 49 (only illustrated my means of a symbol in FIGS. 5 and 6) able to provide an electronic control unit ECU of the transmission with a signal indicative of the position of the plunger 36 for position feedback control of each actuator.

The hydraulic circuit of the electro-hydraulic control system according to the invention will be described now with reference to FIG. 5, in its configuration intended for a double-clutch transmission with six forward gears and one reverse gear, such as the one shown in FIG. 1. As will be better explained herein below, the hydraulic circuit is arranged both to control the hydraulic actuators 22, 24, 26 and 28 of the gear shift control device 10 so as to shift each time from one gear to another on the base of the commands imparted by the electronic control unit ECU, and to control hydraulic actuating means, such as for example two additional hydraulic actuators (not shown) operable to control the friction clutches of the clutch unit 110 of the transmission.

The hydraulic control circuit basically comprises:
a supply unit 50,
a slide valve 52 (hereinafter referred to as selection slide valve) movable among four operating positions in each of which one of the four hydraulic actuators 22, 24, 26 or 28 is selected,
a first pair of three-way two-position proportional solenoid valves 54 and 56 (hereinafter referred to as gear shift solenoid valves) for controlling the hydraulic actuator each time selected by the selection slide valve 52 to engage either of the gears associated to that actuator,
a second pair of three-way two-position proportional solenoid valves 58 and 60 (hereinafter referred to as clutch control solenoid valves) for controlling each a respective friction clutch of the clutch unit 110 of the transmission, and
an additional three-way two-position proportional solenoid valve 62 (hereinafter referred to as pilot solenoid valve) for controlling the displacement of the selection slide valve 52 among the four operating positions thereof.

The expression "to select an actuator" used above is to be intended in the following description and claims as to put the two chambers 42 and 44 of the actuator in question in such a condition that they are connected to the supply unit 50 through the two gear shift solenoid valves 54 and 56.

In the example illustrated in FIG. 5, the two gear shift solenoid valves 54 and 56 are pressure proportional solenoid valves, the two clutch control solenoid valves 58 and 60 are a flow rate proportional solenoid valve and a pressure proportional solenoid valve, respectively, and the pilot solenoid valve 62 is a pressure proportional solenoid valve. It is however clear that each solenoid valve which is shown as a pressure proportional solenoid valve might be alternatively a flow rate proportional solenoid valve and on the other hand each solenoid valve which is shown as a flow rate proportional solenoid valve might be alternatively a pressure proportional solenoid valve.

The hydraulic control circuit further comprises a supply line 64 and a discharge line 66, through which the five solenoid valves 54, 56, 58, 60 and 62 are connected to the supply unit 50 and to a tank 68, respectively. The two gear shift solenoid valves 54 and 56 are connected each to a respective inlet of the selection slide valve 52 through a respective line 70 and 72. The chambers 42 and 44 of the first hydraulic actuator 22 (first gear and third gear) are connected to a first pair of outlets of the selection slide valve 52 through a pair of lines 74 and 76, respectively. The chambers 42 and 44 of the second hydraulic actuator 24 (sixth gear and possible seventh gear) are connected to a second pair of outlets of the selection slide valve 52 through a pair of lines 78 and 80, respectively. The chambers 42 and 44 of the third hydraulic actuator 26 (fifth gear and reverse gear) are connected to a third pair of outlets of the selection slide valve 52 through a pair of lines 82 and 84, respectively. The chambers 42 and 44 of the fourth hydraulic actuator 28 (second gear and fourth gear) are connected to a fourth pair of outlets of the selection slide valve 52 through a pair of lines 86 and 88, respectively.

In FIG. 5, the gear which can be engaged by the control system when either of the chambers 42 and 44 of the hydraulic actuators 22, 24, 26 and 28 is supplied with fluid is indicated by Roman numerals (as far as the forward gears are concerned) or by the letter R (as far as the reverse gear is concerned) near each chamber. For example, engagement of the third gear is obtained by supplying working fluid to the chamber 42 of the first hydraulic actuator 22, whereas engagement of the first gear is obtained by supplying working fluid to the chamber 44 of the first hydraulic actuator 22 and so on for the other hydraulic actuators 24, 26 and 28.

The selection slide valve 52 is held in a first operating position thereof (rest position) by a spring 90 and can be moved into the other three operating positions by the pilot solenoid valve 62 through a pilot line 92. The selection slide valve 52 is provided with a position sensor 94 (indicated only by means of a symbol), or alternatively with a pressure sensor, for position (or pressure) control of the slide valve itself. In each of the four operating positions of the selection slide valve 52, the two inlets of the slide valve connected to the two gear shift solenoid valves 54 and 56 through the lines 70 and 72 are put into communication each time with two outlets of the slide valve connected to a respective hydraulic actuator 22, 24, 26 or 28. In particular, the rest position of the selection slide valve 52, in which the slide valve is held by the spring 90 against a special mechanical stop, corresponds to the condition of selection of the hydraulic actuator 22, in which the lines 70 and 72 are put into communication with the lines 74 and 76, respectively, and hence the gear shift solenoid valves 54 and 56 are able to supply the chambers 42 and 44 of the hydraulic actuator 22 with fluid or to connect them to the tank to move the associated shift fork 12 into either of the engagement positions, corresponding to the engagement of the third gear or to the engagement of the first gear, respectively. The adjacent position of the selection slide valve 52 corresponds to the condition of selection of the hydraulic actuator 24, in which the lines 70 and 72 are put into communication with the lines 78 and 80, respectively, and hence the gear shift solenoid valves 54 and 56 are able to supply the chambers 42 and 44 of the hydraulic actuator 24 with fluid or to connect them to the tank to move the associated shift fork 14 into either of the engagement positions, corresponding to the engagement of the sixth gear or to the engagement of the seventh gear, respectively. The adjacent position of the selection slide valve 52 corresponds to the condition of selection of the hydraulic actuator 28, in which the lines 70 and 72 are put into communication with the lines 86 and 88, respectively, and hence the gear shift solenoid valves 54 and 56 are able to supply the chambers 42 and 44 of the hydraulic actuator 28 with fluid or to connect them to the tank to move the associated shift fork 18 into either of the engagement positions, corresponding to the engagement of the fourth gear or to the engagement of the second gear, respectively. Finally, the position of the selection slide valve 52 opposite to the rest position, in which the slide valve abuts against a special mechanical stop, corresponds to the condition of selection of the hydraulic actuator 26, in which the lines 70 and 72 are put into communication with the lines 82 and 84, respectively, and hence the actuator control solenoid valves 54 and 56 are able to supply the chambers 42 and 44 of the hydraulic actuator 26 with fluid or to connect them to the tank to move the associated shift fork 16 into either of the engagement positions, corresponding to the engagement of the fifth gear or of the reverse gear, respectively.

The solenoid valves 54, 56, 58, 60 and 62 of the hydraulic circuit are feedback controlled by the electronic control unit ECU, which receives as inputs the signals coming from the position sensors 49 of the hydraulic actuators 22, 24, 26 and 28, from the position (or pressure) sensor 94 of the selection slide valve 52 and from position (or pressure) sensors associated to the friction clutches of the clutch unit 110, and sends as outputs the control signals to the solenoid valves.

A variant of construction of the hydraulic circuit of FIG. 5, intended to be used in an electro-hydraulic control apparatus for a motor-vehicle single-clutch transmission with six forward gears and one reverse gear, such as the one shown in FIG. 2, is illustrated in FIG. 6, where parts and elements identical or corresponding to those of FIG. 5 have been given the same reference numerals.

The hydraulic circuit of FIG. 6 differs from the one of FIG. 5 mainly in that it comprises only one friction clutch solenoid valve 58, since the circuit is intended for a transmission having only one friction clutch. As in the hydraulic circuit of FIG. 5, all the solenoid valves 54, 56, 58 and 62 are proportional solenoid valves. Preferably, the gear shift solenoid valves 54 and 56 and the pilot solenoid valve 62 are pressure proportional solenoid valves, whereas the friction clutch solenoid valve 58 is a flow rate proportional solenoid valve.

Also the gears which can be engaged by the four hydraulic actuators 22, 24, 26 and 28 are different from those of the hydraulic circuit of FIG. 5. In this case, in fact, the hydraulic actuator 22 associated to the engagement sleeve 112 controls the engagement of the first gear and of the second gear, the hydraulic actuator 24 associated to the engagement sleeve 114 controls the engagement of the fifth gear and of the sixth gear, the hydraulic actuator 26 associated to the engagement sleeve 116 controls the engagement of the reverse gear, whereas the hydraulic actuator 28 associated to the engagement sleeve 118 controls the engagement of the third gear and of the fourth gear. Also in this case, however, the two opposite end-of-travel positions of the selection slide valve 52 correspond to the selection of the hydraulic actuator 22 (first gear and second gear) and of the hydraulic actuator 26 (reverse gear).

Figure 7:
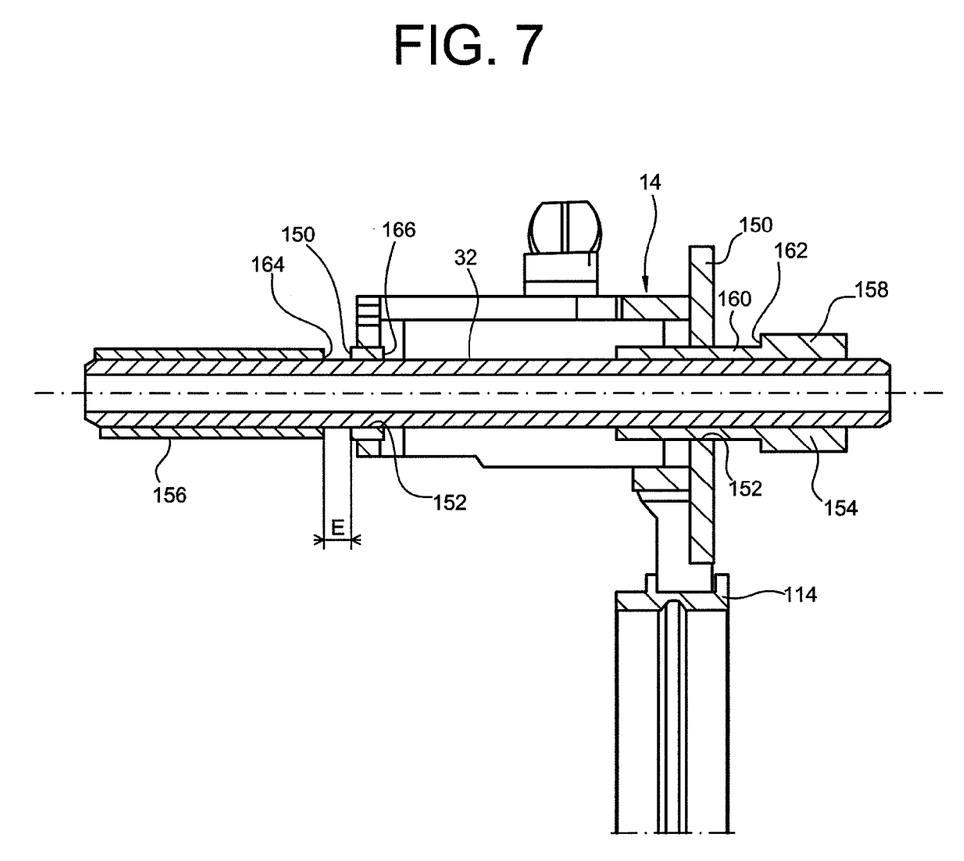
FIG. 7 is an axial section view on an enlarged scale which shows the arrangement according to the present invention of a shift fork associated to the sixth gear in the gearbox of FIG. 1.

With reference in particular to FIG. 7, the arrangement of the shift fork 14 on the support rod 32, the fork being associated to the "single" engagement sleeve 114 operable to engage the sixth gear only in the gearbox of FIG. 1, will be described now. It is however clear that the same arrangement is applicable also to the shift fork 16 associated to the "single" engagement sleeve 116 operable to engage the reverse gear only in the gearbox of FIG. 2. Moreover, even though the example illustrated in FIG. 7 refers to the case of a shift fork slidably mounted on a stationary support rod, the invention is clearly also applicable to the case of a shift fork fixed onto a sliding support rod.

The fork 14 comprises a pair of support plates 150 having respective coaxial through holes 152 for guiding the fork along the rod 32. A pair of end-of-travel elements 154 and 156 made as bushes are mounted on the rod 32. More specifically, the right-hand bush 154 is made as a double-diameter bush which comprises a first right-hand portion 158 of larger diameter and a second left-hand portion 160 of smaller diameter on which the guide hole 152 of the right-hand support plate 150 of the fork is guided. In this way, the bush 154 forms an axial abutment surface 162 able to cooperate with the right-hand support plate 150 of the fork 14 to define the right-hand end-of-travel position corresponding to the engagement position of the sixth gear. The bush 154 is advantageously made of low-friction plastics. The left-hand bush 156 has an axial abutment surface 164 arranged to cooperate with the left-hand support plate 150 of the fork 14 to define a left-hand end-of-travel position for the fork itself. The through hole 152 of the left-hand support plate 150 is provided with a guide bush 166 of low friction and high wear resistance plastics, which is preferably obtained by overmoulding and makes it possible to guide that support plate directly on the rod 32 while ensuring a low sliding resistance and a high wear resistance.

In FIG. 7 the shift fork 14 is shown in the neutral position, in which the associated sliding engagement sleeve 114 uncouples the idle driven gearwheel of sixth gear 136 from the respective secondary shaft 104. According to the invention, the left-hand end-of-travel position defined by the bush 156 is axially spaced from the neutral position of the fork 14, and the fork 14 can therefore run an additional travel E in the disengagement direction, i.e. to the left with respect to the person looking at FIG. 7, from the neutral position to the left-hand end-of-travel position defined by the axial abutment surface 164 of the bush 156. The additional travel E shall be larger than the sensibility of the position sensor 49 associated to the hydraulic actuator 24 which controls the movement of the fork 14, but smaller than the neutral band defined by the position-marking ball 47, i.e. of the travel the plunger 36 must run in order for the position-marking ball 47 to shift from the positioning notch 45 corresponding to the neutral position to the adjacent positioning notch.

Such a measure makes it possible to reveal any failure or malfunctioning of the solenoid valve 54 controlling the disengagement of the sixth gear, since in this case the linear position sensor 49 of the hydraulic actuator 24 would not detect any displacement of the plunger 36, as well as any electrical, hydraulic or mechanical failure to the gear shift control system, which failure entails the switch-off signal not being received by the solenoid valve 54 controlling the disengagement of the sixth gear at the end of the phase of disengagement of that gear, since in this case the shift fork 14 would be stopped not in the real neutral position, but rather in the end-of-travel position by means of the bush 156, and the linear position sensor 49 of the hydraulic actuator 24 would therefore detect a larger displacement of the plunger 36 than the theoretical one (due to the additional travel E). Finally, any failure or malfunctioning of the linear position sensor 49 would not cause problems either, since the disengagement operation would end in a false neutral position, i.e. in the left-hand end-of-travel position.

Naturally, the principle of the invention remaining unchanged, the embodiments and constructional details may vary widely with respect to those described and illustrated purely by way of non-limiting example.

What is claimed is:

1. Motor-vehicle gearbox comprising:
   an engagement sleeve movable between a neutral position and one engagement position for engagement of one given gear,
   a sliding shift fork operatively connected to the engagement sleeve for controlling the movement thereof between the neutral position and the engagement position,
   a linear hydraulic actuator having a plunger, wherein the plunger is connected to the shift fork for controlling the translational movement thereof and has three positioning notches equally spaced in the sliding direction of the plunger,
   a linear position sensor able to provide a signal indicative of the position of the plunger of the linear hydraulic actuator,
   a position-marking ball adapted to engage alternatively in one of the three positioning notches to hold the engagement sleeve in the neutral position or in the engagement position,
   a first axial abutment surface for stopping the movement of the shift fork in the direction from the neutral position to the engagement position and a second axial abutment surface for stopping the movement of the shift fork in the direction from the engagement position to the neutral position,
   wherein in the neutral position the shift fork is axially spaced from the second axial abutment surface by a distance which is larger than the sensibility of the linear position sensor, but smaller than the travel the plunger must run in order for the position-marking ball to shift from the positioning notch corresponding to the neutral position to the adjacent positioning notch.

2. Gearbox according to claim 1, comprising a stationary support rod on which the shift fork is mounted.

3. Gearbox according to claim 2, further including first and second bushes mounted on the support rod, wherein the first bush defines the first axial abutment surface and the second bush defines the second axial abutment surface.

4. Gearbox according to claim 3, wherein the shift fork includes a pair of support plates each having a respective guide through hole, of which the one guide through hole is provided with a guide bush and is guided along the support rod and the other guide through hole is guided along a portion of the first bush.

5. Gearbox according to claim 4, wherein the first bush comprises a first, axially inner bush portion and a second, axially outer bush portion, wherein the first bush portion has a smaller diameter than the second bush portion, wherein the guide through hole of said shift fork is guided along the first bush portion and wherein the second bush portion forms the first axial abutment surface.

6. Gearbox according to claim 4, wherein the first bush and the guide bush are made of plastics.

7. Gearbox according to claim 6, wherein the guide bush is obtained by overmoulding over said shift fork.

\* \* \* \* \*